(12) United States Patent
Nakamura et al.

(10) Patent No.: US 7,643,193 B2
(45) Date of Patent: Jan. 5, 2010

(54) OPTICAL SCANNING APPARATUS AND IMAGE FORMING APPARATUS

(75) Inventors: Tadashi Nakamura, Kanagawa (JP);
Yoshinori Hayashi, Kanagawa (JP);
Naoki Miyatake, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 178 days.

(21) Appl. No.: 11/759,642

(22) Filed: Jun. 7, 2007

(65) Prior Publication Data
US 2007/0297036 A1    Dec. 27, 2007

(30) Foreign Application Priority Data
Jun. 21, 2006    (JP)    ............. 2006-171546

(51) Int. Cl.
*G02B 26/08*    (2006.01)
(52) U.S. Cl. ............. 359/205.1; 359/199.1; 359/215.1; 347/243; 347/259
(58) Field of Classification Search ............. None
See application file for complete search history.

(56) References Cited

U.S. PATENT DOCUMENTS

| 6,757,089 | B2 * | 6/2004 | Hayashi .................. 359/212 |
| 6,972,883 | B2 | 12/2005 | Fujii et al. |
| 7,050,739 | B2 | 5/2006 | Nakazato et al. |
| 2003/0053156 | A1 | 3/2003 | Satoh et al. |
| 2005/0243396 | A1 | 11/2005 | Fujii et al. |
| 2006/0012844 | A1 | 1/2006 | Fujii et al. |
| 2006/0028533 | A1 | 2/2006 | Nakajima |
| 2006/0232660 | A1 | 10/2006 | Nakajima et al. |
| 2006/0245009 | A1 | 11/2006 | Akiyama et al. |

FOREIGN PATENT DOCUMENTS

| JP | 2002-82303 | 3/2002 |
| JP | 2002-258204 | 9/2002 |
| JP | 2005-215571 | 8/2005 |

OTHER PUBLICATIONS

U.S. Appl. No. 11/745,919, filed May 8, 2007, Hayashi.
U.S. Appl. No. 12/028,346, filed Feb. 8, 2008, Arai, et al.
U.S. Appl. No. 12/024,505, filed Feb. 1, 2008, Watanabe, et al.

(Continued)

*Primary Examiner*—James Phan
(74) *Attorney, Agent, or Firm*—Oblon, Spivak, McClelland, Maier & Neustadt, L.L.P.

(57) ABSTRACT

An optical scanning apparatus includes a light source, a light source driving unit that turns on the light source according to image information, a deflector that deflects and scans a light beam emitted from the light source according to sinusoidal vibration, and a scanning/imaging optical system that guides the light beam from the deflector to a scanned surface. The scanning/imaging optical system satisfies two conditions, i.e., (1) provided that the deflector moves in such a manner that an angular velocity is constant, linearity is made larger at a most peripheral image height than at a central image height within a range of an effective writing width, and (2) when a deflection angle of the deflector has a sinusoidal characteristic, the linearity is made smaller at the most peripheral image height than at the central image height within the range of the effective writing width.

5 Claims, 5 Drawing Sheets

OTHER PUBLICATIONS

U.S. Appl. No. 12/023,414, filed Jan. 31, 2008, Nakamura.
U.S. Appl. No. 12/021,850, filed Jan. 29, 2008, Watanabe, et al.
U.S. Appl. No. 12/020,292, filed Jan. 25, 2008, Miyatake, et al.
U.S. Appl. No. 12/031,362, filed Feb. 14, 2008, Arai, et al.
U.S. Appl. No. 12/193,902, filed Aug. 19, 2008, Miyatake.
U.S. Appl. No. 12/204,483, filed Sep. 4, 2008, Nakamura.

* cited by examiner (a) MAIN SCANNING SECTION (b) SUB-SCANNING SECTION

OPTICAL SCANNING APPARATUS AND IMAGE FORMING APPARATUS

CROSS-REFERENCE TO RELATED APPLICATIONS

The present document incorporates by reference the entire contents of Japanese priority document, 2006-171546 filed in Japan on Jun. 21, 2006.

BACKGROUND OF THE INVENTION

1. Field of the Invention

The present invention relates generally to an optical scanning apparatus and an image forming apparatus. More particularly, the present invention relates to a deflection mirror (vibration mirror) which is applicable to, for example, optical scanning apparatuses, light-scanning type display devices, and in-vehicle laser radar apparatuses, an optical scanning apparatus which includes such a deflection mirror, and an image forming apparatus, such as a digital copier, a printer, a plotter, and a facsimile that includes the above optical scanning apparatus.

2. Description of the Related Art

Conventionally known optical scanning apparatus deflects a light beam using a deflector such as a light deflecting unit, focuses the deflected light beam on a scanned surface as a minute spot-beam, and scans the scanned surface in a main scanning direction at a constant speed. Such an optical scanning apparatus is applied to various image forming apparatuses such as laser beam printers, laser beam plotters, facsimiles, and digital copiers, as a latent image writer. The optical scanning apparatus deflects and reflects a laser beam emitted from a laser light source using a light deflecting unit, for example, thereby scanning a scanned surface of an image carrier, for example. Simultaneously with the scanning, the optical scanning apparatus modulates the intensity of the laser beam (for example, by turning on and off the laser beam) according to image signals. Thus the optical scanning apparatus writes an image onto the scanned surface.

One type of widely used light deflecting units is a rotary polygon mirror (i.e., polygon scanner) that rotates at a constant speed. The rotary polygon mirror, however, is large, and its high-speed mechanical rotation generates vibrations which induce various inconveniences such as banding, temperature rise, noises, and increase in power consumption. Another light deflecting unit proposed is a micro mirror which has a resonant structure undergoing sinusoidal vibration based on a micro machine technology. When the micro mirror is employed as the deflector of the optical scanning apparatus, the optical scanning apparatus can be downsized and the above-listed inconveniences such as banding, temperature rise, noises, and increased power consumption caused by the vibrations can be significantly reduced.

In brief, when the micro mirror which undergoes sinusoidal vibration is employed in an image forming apparatus instead of the polygon mirror, a less-noisy, less power consuming, and environment-friendly image forming apparatus suitable for office environment can be provided.

When the micro mirror is employed as the deflector and undergoes sinusoidal vibrations, deflection angle varies in a sinusoidal manner. Currently, an f-theta lens is generally used in a writing optical system. However, when the micro mirror is employed as the deflector together with the f-theta lens in a scanning/imaging optical system, scanning speed slows near a peripheral image height and is not constant over the scanned surface. When the constant velocity characteristic of the scanning is degraded, the image becomes distorted at peripheral portions thereof in the main scanning direction, whereby the image quality lowers.

To deal with the problem described above, Japanese Patent Application Laid-Open No. 2005-215571 proposes an optical scanning apparatus including a scanning/imaging optical system whose imaging characteristic (farcsin characteristic) can be represented by a following equation (1):

$$H = K \times \sin^{-1}(\phi/2\phi_0) \tag{1},$$

where H represents image height, K represents proportionality factor, $\phi$ represents swing angle, and $\phi_0$ represents amplitude. Using the above scanning/imaging optical system, the optical scanning apparatus optically corrects a waist position of a main scanning light beam so as to realize a wide effective writing width and a favorable constant velocity characteristic of the scanning. In the disclosed optical scanning apparatus, however, when the optical correction is performed as described above, a spot diameter of the main scanning light beam on the scanned surface deviates more widely corresponding to the image height, thereby degrading the image quality.

In the optical scanning apparatus using the micro mirror undergoing the sinusoidal vibrations as a deflector, there is a trade-off between the constant velocity characteristic of the scanning and the deviation of the spot diameter of the main scanning light beam on the scanned surface corresponding to the image height. No optical scanning apparatus so far has realized favorable characteristics for both so as to realize high-quality image formation.

An optical scanning apparatus according to one embodiment described in Japanese Patent Application Laid-Open No. 2005-215571 decreases the deviation of the spot diameter of the main scanning light beam on the scanned surface corresponding to the image height, by using a scanning/imaging optical system which has the same level of sensitivity of a focusing position relative to an incident angle of a light beam to the deflector at a central image height and at a peripheral image height, in other words, which has the same scanning speed at a central image height and at a peripheral image height, or which makes the sensitivity (i.e., the scanning speed) lower (slower) at the peripheral image height than at the central image height. In other words, the optical scanning apparatus reduces the deviation in the spot diameter of the main scanning light beam on the scanned surface corresponding to the image height by using the scanning/imaging optical system whose linearity is substantially zero for all image heights on the scanned surface or whose linearity is biased towards a negative side at the peripheral image height. However, every embodiment disclosed in Japanese Patent Application Laid-Open No. 2005-215571 has problems as described below and has not succeeded in solving the problems mentioned above.

In a first embodiment of Japanese Patent Application Laid-Open No. 2005-215571, the deflector determines the width of the main scanning light beam. Therefore, the spot diameter of the main scanning light beam is larger at the peripheral image height than at the central image height on the scanned surface. The first embodiment corrects the deviation in the spot diameter of the main scanning light beam by giving the scanning/imaging optical system such a characteristic that the linearity is deteriorated, in other words, that the linearity is biased towards the negative side even further than the linearity of the apparatus employing an f-theta lens as the deflector. In the first embodiment, though the deviation of the spot diameter of the main scanning light beam corresponding to the image height is favorably corrected, the constancy of the scanning speed is significantly degraded because the linearity is made excessively negative even in comparison with the case where f-theta lens is employed as the deflector. Thus, high-quality images cannot be obtained.

In an optical scanning apparatus according to a second embodiment of the Japanese Patent Application Laid-Open No. 2005-215571, in which the deflector determines the width of the main scanning light beam, the f-theta lens is employed in the scanning/imaging optical system, and the swing angle of the micro mirror which serves as the deflector and undergoes the sinusoidal vibration is set smaller than maximum amplitude. When the swing angle of the micro mirror is small, linear changes become dominant over sinusoidal changes in the deflection speed variations. Thus, the scanning speed is made sufficiently constant, and the deviation in the spot diameter of the main scanning light beam corresponding to the image height is corrected to a favorable level. However, since the swing angle of the micro mirror is small, an effective writing width for image formation cannot be secured without a long distance between the micro mirror and the scanned surface. This requirement makes the optical scanning apparatus larger, limiting the overall dimension of the apparatus.

In an optical scanning apparatus according to a fourth embodiment of the Japanese Patent Application Laid-Open No. 2005-215571, which is similarly configured to an apparatus shown in FIG. 1, an f-theta lens is employed in the scanning/imaging optical system. In this case, the scanning speed slows at the peripheral image height as described earlier, and the scanning speed cannot be made constant over the scanned surface. When the constancy of the scanning speed is not sufficient, the image is sometimes distorted at the peripheral portion in the main scanning direction, degrading the image quality.

Further, in optical scanning apparatuses described in Japanese Patent Applications Laid-Open Nos. 2002-258204 and 2002-82303, a micro mirror which undergoes sinusoidal vibration is used as the deflector. The described optical scanning apparatuses do not optically correct the waist position of the main scanning light beam by using a scanning/imaging optical system which has the imaging characteristic as represented by the equation (1), but makes the swing angle of the micro mirror smaller relative to the maximum amplitude. As described above, in this case, the linear changes become dominant over sinusoidal changes in the deflection speed variations. Therefore, the scanning speed is made sufficiently constant, and the deviation of the spot diameter of the main scanning light beam according to image height is corrected to a favorable level. However, because of the reduced swing angle of the micro mirror, the optical scanning apparatus is required to be larger to secure an effective writing width necessary for image formation. Thus, there is a limitation on the overall dimension of the apparatus.

In order to realize a high image quality and downsizing of the optical scanning apparatus and the image forming apparatus, the optical scanning apparatus is required to realize constancy in the scanning speed on the scanned surface, and an acceptable level of deviation in the spot diameter of the main scanning light beam when scanning the scanned surface with the light beams deflected and reflected by the light deflecting unit. At the same time, the optical scanning apparatus is required to have a predetermined effective writing width necessary for image formation. These requirements need to be satisfied similarly by an optical scanning apparatus including a deflection mirror which utilizes resonance as mentioned earlier.

Conventionally, an optical scanning apparatus realizes a predetermined effective writing width and a favorable constancy in scanning speed by using a scanning/imaging optical system having an imaging characteristic as represented by the equation (1), and optically correcting the waist position of the main scanning light beam:

$$H = K \times \sin^{-1}(\phi/2\phi_0) \qquad (1),$$

where H represents image height, K represents proportionality factor, $\phi$ represents swing angle, and $\phi_0$ represents amplitude. When the scanning/imaging optical system having the imaging characteristic represented by the equation (1) is employed, however, the spot diameter of the main scanning light beam becomes deviated corresponding to the image height as is known from Japanese Patent Application Laid-Open No. 2002-258204.

Further, when the scanning/imaging optical system which has imaging characteristics of the f-theta lens and which scans the scanned surface at a constant speed using the light beam deflected and reflected by a deflector such as a polygon mirror that rotates at a constant speed is employed in a writing optical system which uses a deflection mirror that undergoes sinusoidal vibration utilizing the resonance, the deviation in the spot diameter of the main scanning light beam on the scanned surface corresponding to the image height can be reduced while the predetermined effective writing width is secured. However, the linearity on the scanned surface is significantly biased toward the negative side, and the constancy of the scanning speed is deteriorated.

Further, when the swing angle of the deflection mirror which undergoes sinusoidal vibration utilizing the resonance is made small, though the constancy of the scanning speed and the deviation of the spot diameter of the main scanning light beam on the scanned surface corresponding to the image height can be made favorable, a larger distance between the deflection mirror and the scanned surface is required to secure a predetermined effective writing width, whereby the apparatus becomes large.

SUMMARY OF THE INVENTION

It is an object of the present invention to at least partially solve the problems in the conventional technology.

According to one aspect of the present invention, an optical scanning apparatus includes a light source, a light source driving unit that turns on the light source according to image information, a deflector that deflects and scans a light beam emitted from the light source according to sinusoidal vibration, and a scanning/imaging optical system that guides the light beam from the deflector to a scanned surface. The scanning/imaging optical system satisfies (1) provided that the deflector moves in such a manner that an angular velocity is constant, linearity is made larger at a most peripheral image height than at a central image height within a range of an effective writing width, and (2) when a deflection angle of the deflector has a sinusoidal characteristic, the linearity is made smaller at the most peripheral image height than at the central image height within the range of the effective writing width.

According to another aspect of the present invention, an image forming apparatus includes an image carrier, a charging unit that charges the image carrier, an optical writing unit that directs light to the image carrier charged to form a latent image, a developing unit that develops the latent image to form a visible image, and a transferring unit that transfers the visible image on the image carrier to a transfer material to form an image, and the optical writing unit is the optical scanning apparatus according to one aspect of the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings.

Structures, operations, and functions of an optical scanning apparatus and an image forming apparatus including the optical scanning apparatus according to the present invention will be described in detail below with reference to the accompanying drawings.

Figure 1A:
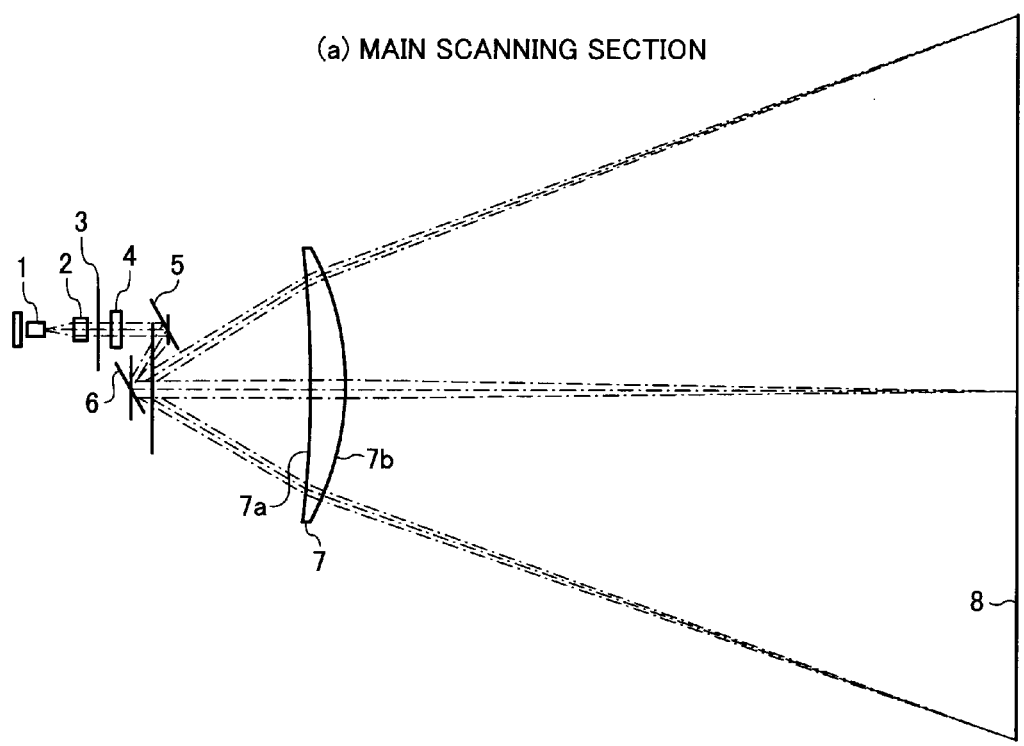
FIG. 1A is a schematic diagram of an optical scanning apparatus according to one embodiment of the present invention, and shows in particular an arrangement of optical systems in a section along a main scanning direction (main scanning section) of the optical scanning apparatus.
Figure 1B:
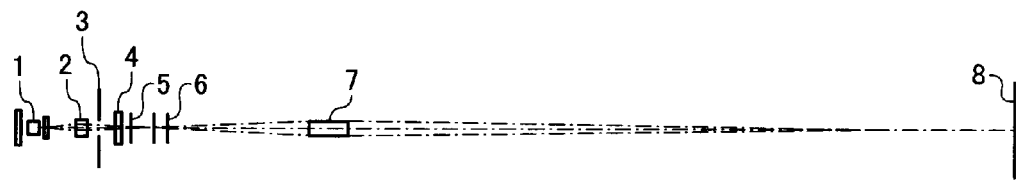
FIG. 1B is a schematic diagram of the optical scanning apparatus according to one embodiment of the present invention, and shows in particular an arrangement of the optical system in a section along a sub-scanning direction (sub-scanning section) of the optical scanning apparatus.

FIGS. 1A and 1B are schematic diagrams of an optical scanning apparatus according to one embodiment of the present invention. FIG. 1A shows arrangement of optical systems of the optical scanning apparatus in a section along a main scanning direction (i.e., main scanning section). FIG. 1B shows arrangement of the optical systems of the optical scanning apparatus in a section along a sub-scanning direction (i.e., sub-scanning section). In FIGS. 1A and 1B, reference character 1 denotes a laser diode (LD) which serves as a light source, 2 denotes a collimator lens which converts a light beam emitted from the laser diode into a substantially parallel light beam, 3 denotes an aperture which defines a diameter of the light beam, 4 denotes a cylindrical lens which has a refracting power only in the sub-scanning direction, 5 denotes an entrance mirror, 6 denotes a deflector which deflects the light beam emitted from the laser diode, 7 denotes a scanning/imaging lens of a scanning/imaging optical system, and 8 denotes a scanned surface.

In the optical scanning apparatus having the structure as shown in FIGS. 1A and 1B, the laser diode 1 which serves as the light source emits the light beam. The collimator lens 2 converts the emitted light beam into a substantially parallel light beam. The aperture 3 narrows a diameter of the parallel light beam. The cylindrical lens 4 transmits the narrowed parallel light beam and forms a linear image which extends in the main scanning direction. The entrance mirror 5 reflects the light beam having passed through the cylindrical lens 4 as shown in FIG. 1B and guides the reflected light beam to the deflector 6 at an incident angle in the sub-scanning section. The deflector 6 which serves as a deflecting unit deflects and reflects the light beam. After being deflected by the deflector 6, the light beam passes through the scanning/imaging lens 7 and is focused on the scanned surface 8.

The scanning/imaging lens 7 has such a characteristic that when the deflector is a polygon mirror, the linearity within the range of the effective writing width is positive, and when the deflector is a sinusoidal vibration mirror, the linearity within the range of the effective writing width is negative. In other words, the scanning/imaging lens 7 has an imaging characteristic which can achieve a good balance between the linearity on the scanned surface and the deviation in the spot diameter of the main scanning light beam according to image height, with regard to the trade-off relation between the linearity on the scanned surface and the deviation of the spot diameter of the main scanning light beam corresponding to the image height.

Thus, the optical scanning apparatus can achieve good linearity on the scanned surface as well as a favorable degree of deviation of the spot diameter of the main scanning light beam corresponding to the image height without narrowing the swing angle of the deflector relative to the maximum rotational angle.

Here, the linearity takes a value on the negative side in comparison with the linearity of the scanning/imaging lens which has the farcsin characteristic, so as to correct the deviation in the spot diameter of the main scanning light beam on the scanned surface corresponding to the image height to a favorable level. At the same time, the linearity takes a vale on the positive side in comparison with the linearity of the scanning/imaging lens having the f-theta characteristic, so as to have a good linearity characteristic.

Further, when the scanning/imaging lens 7 satisfies a following conditional equation (2);

$$-0.09 < Lin. \times (\phi_{max}/\phi_0) < 0 \qquad (2),$$

where Lin. represents linearity at each image height, $\phi_0$ represents swing angle (°) of the sinusoidal vibration of the deflector, and $\phi_{max}$ represents maximum rotational angle (°) of the deflector corresponding to the effective writing width, the optical scanning apparatus can realize a wider effective writing width, or better constancy in the scanning speed on the scanned surface, or less deviation of the spot diameter of the main scanning light beam on the scanned surface corresponding to the image height.

First Embodiment

Design data of an optical scanning apparatus according to a first embodiment of the present invention will be described below. Since the optical scanning apparatus according to the first embodiment is not largely different from the optical scanning apparatus having the structure shown in FIG. 1, the first embodiment will be described with reference to FIG. 1. Vibration characteristics of a sinusoidal vibration mirror which serves as the deflector 6 can be represented as follows:

$\phi_0: \pm 25°$, $\phi_{max} \pm 15°$, and hence, $\phi_{max}/\phi_0 = 0.600$.

Here, the light beam is collected along the sub-scanning direction and comes into the sinusoidal vibration mirror as the deflector 6 at one point on the sinusoidal vibration mirror as the deflector 6.

A lens surface of the scanning/imaging lens 7 at the side from which the light beam enters is denoted as 7a, and another lens surface of the scanning/imaging lens 7 from which the light beam is emitted is denoted as 7b. Distance between the sinusoidal vibration mirror as the deflector 6 and the lens surface 7a of the scanning/imaging lens 7 is 54.14 mm, whereas distance between the lens surface 7b of the scanning/imaging lens 7 and the scanned surface 8 is 206 mm.

Design data of each of the lens surfaces 7a and 7b is shown in Table 1, where Rm is paraxial curvature radius in the main scanning direction, Rs is paraxial curvature radius in the sub-scanning direction, D is thickness of the scanning/imaging lens, and N is refractive index at wavelength of 780 nm.

TABLE 1

| surface | Rm | Rs | D | N |
|---|---|---|---|---|
| 7a | −620.84 | −4478.64 | 11.00 | 1.5305 |
| 7b | −91.74 | −24.28 | | |

Shapes of the surfaces 7a and 7b of the scanning/imaging lens 7 which forms the scanning/imaging optical system can be represented by a following equation (3):

$$X(Y, Z) = (1/Rm) \cdot Y^2 / \{1 + \sqrt{(1 - (1 + a_0) \cdot (1/Rm)^2 \cdot Y^2)}\} + a_4 \cdot Y^4 + a_6 \cdot Y^6 + \cdots + Cs(Y) \cdot Z^2 / \{1 + \sqrt{(1 - Cs(Y)^2 \cdot Z^2)}\}, \quad (3)$$

where $Cs(Y) = 1/Rs + b_2 \cdot Y^2 + b_4 \cdot Y^4 + \ldots$

Further, factors corresponding to each surface in the equation (3) are as follows:

For the surface 7a;

$a_0 = 1.34E+01$, $a_4 = -9.45E-07$, $a_6 = 5.81E-10$, $a_8 = -1.25E-13$, $a_{10} = 1.32E-17$, $b_2 = -1.87E-05$, $b_4 = 4.91E-09$, and $b_6 = -5.64E-13$.

where $E+01 = \times 10^{01}$, $E-07 = \times 10^{-07}$ (the same applies below). For the surface 7b;

$a^0 = -5.74E-01$, $a_4 = -7.66E-07$, $a_6 = 1.74E-10$, $a_8 = 2.95E-14$, $a_{10} = 1.01E-18$, $b_2 = -1.08E-05$, $b_4 = -3.11E-09$, and $b_6 = 8.10E-13$.

Figure 2:
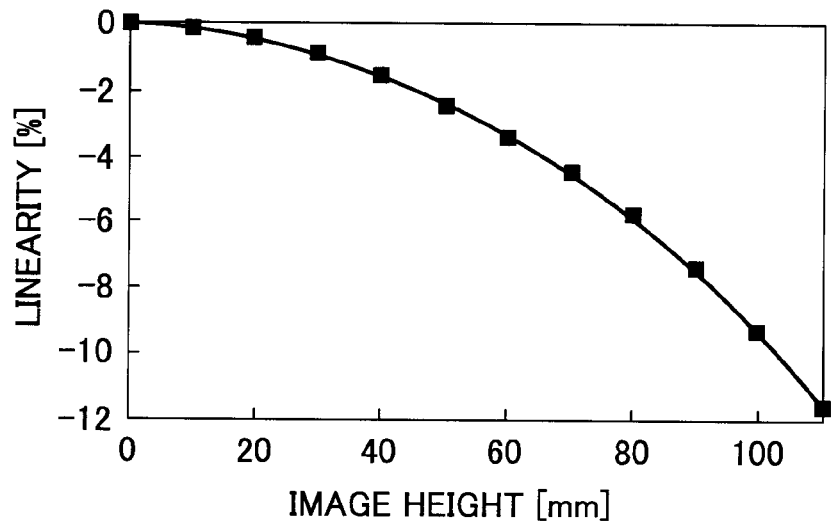
FIG. 2 is a graph of linearity against image height obtained when deflection is performed at a constant speed in the optical scanning apparatus according to the embodiment.
Figure 3:
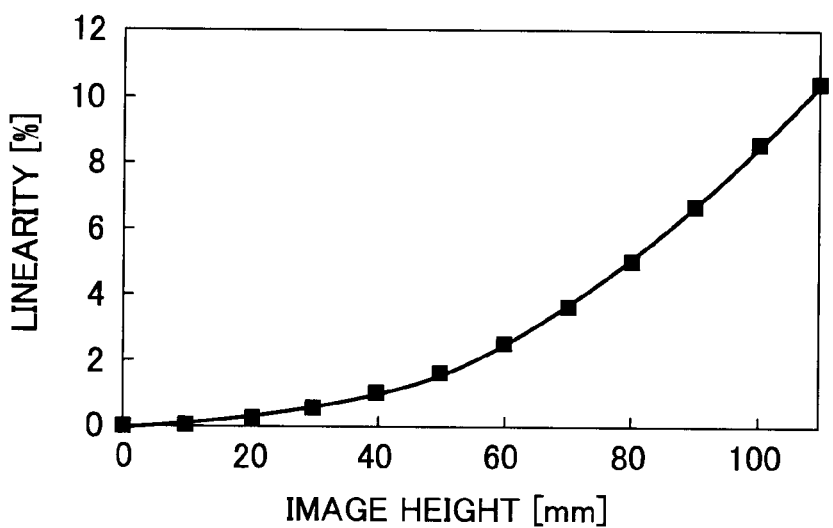
FIG. 3 is a graph of linearity against image height in the optical scanning apparatus according to the embodiment.
Figure 4:
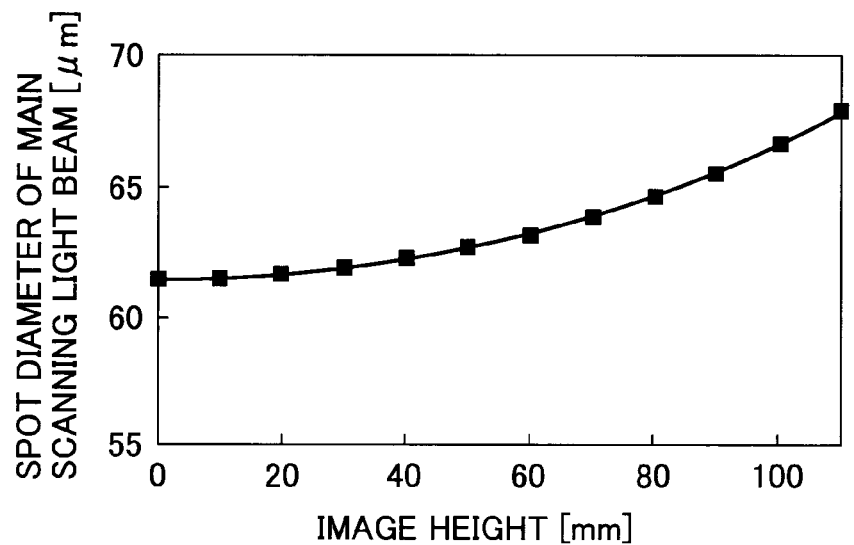
FIG. 4 is a graph of spot diameter of a main scanning light beam against image height in the optical scanning apparatus according to the embodiment.

FIG. 2 is a graph of linearity against image height when the deflection is performed at a constant speed in the optical scanning apparatus of the first embodiment. FIG. 3 is a graph of linearity against image height according to the first embodiment. FIG. 4 is a graph of spot diameter of the main scanning light beam against image height according to the first embodiment.

The linearity at the time the deflection is performed at a constant speed is linearity assumed to be observed when the deflector moves at a constant angular speed, and is represented by a following equation:

$$Lin.(\theta) = \{[H(\theta + \Delta\theta) - H(\theta)]/\Delta\theta - [H(0 + \Delta\theta) - H(0)]/\Delta\theta\} \cdot 100(\%),$$

where $Lin.(\theta)$ is linearity at angle of view $\theta$, $H(\theta)$ is image height at angle of view $\theta$, and $\Delta\theta$ is minute angle.

As shown in FIGS. 2 and 3, the scanning/imaging lens 7 of the first embodiment has such functions as to satisfy: (1) that linearity within the range of the effective writing width is positive when the deflector moves at a constant angular speed; and (2) that linearity within the range of the effective writing width is negative when the deflection angle of the deflector does not change at constant angular speed. Further, since the minimum linearity in the optical scanning apparatus of the first embodiment is −11.57%, $Lin. \times (\phi_{max}/\phi_0) = -0.069$, and a following conditional equation is satisfied:

$-0.09 < Lin. \times (\phi_{max}/\phi_0) < 0$      (2).

In the first embodiment, the sinusoidal vibration mirror is employed as the deflector 6, and the scanning/imaging lens 7 satisfies the above-described conditions. Therefore, in the resulting writing optical system, the deflector has a large maximum rotational angle (15°) corresponding to the effective writing width, the linearity is favorable (−11.57%), and the deviation of the spot diameter of the main scanning light beam corresponding to the image height is favorable (10.50%) as shown in FIG. 4.

As described above, the optical scanning apparatus according to the first embodiment includes the light source, the light source driving unit that turns on the light source according to the image information, the deflector that deflects and scans the light beam from the light source according to the sinusoidal vibration, and the scanning/imaging optical system that guides the light beam from the deflector to the scanned surface, and the scanning/imaging optical system satisfies the following conditions, i.e., (1) provided that the deflector moves at a constant angular velocity, the linearity is positive within the range of the effective writing width, and (2) when the deflection angle of the deflector does not change at a constant angular velocity, the linearity is negative within the range of the effective writing width. In other words, the optical scanning apparatus is made to have the scanning/imaging optical system which has an intermediate characteristic of the scanning/imaging optical system having the farcsin imaging characteristic represented by the equation (1) and the scanning/imaging optical system having the imaging characteristic of the f-theta lens, in other words, the optical scanning apparatus is made to have the scanning/imaging optical system which has such characteristics: that the linearity is biased toward the negative side in comparison with the linearity of the scanning/imaging optical system having the farcsin imaging characteristic represented by the equation (1) so that the deviation in the spot diameter of the main scanning light beam corresponding to the image height is made favorable; and that the linearity is corrected in comparison with the linearity of the scanning/imaging optical system having the imaging characteristic of the f-theta lens so that favorable constancy of the scanning speed is obtained. Thus, without narrowing the swing angle of the deflection mirror undergoing sinusoidal vibrations utilizing resonance, in other words, while maintaining the predetermined effective writing width, the optical scanning apparatus can achieve a favorable constancy of the scanning speed on the scanned surface, and a favorable degree of deviation in the spot diameter of the main scanning light beam on the scanned surface corresponding to the image height. Thereby, the optical scanning apparatus can be downsized, and the inconveniences caused by the vibrations, such as banding, temperature rise, noises, and increased power consumption can be significantly reduced, whereby an environment-friendly optical scanning apparatus suitable for an office environment and capable of forming high-quality images can be provided at low cost. Though the linearity remains biased toward the negative side, the light source driving unit described later can correct the waist position of the main scanning light beam so as to further improve the constancy of the scanning speed.

Further, with regard to the conditional equation (2), i.e., $$-0.09 < Lin. \times (\phi_{max}/\phi_0) < 0 \qquad (2),$$

where Lin. is linearity at each image height, $\phi_0$ is amplitude angle (°) of sinusoidal vibration of the deflector, and $\phi_{max}$ is maximum rotational angle (°) of the deflector corresponding to the effective writing width, in the first embodiment, Lin.$\times (\phi_{max}/\phi_0)$ becomes lower than the lower limit when the swing angle of the deflector corresponding to the maximum rotational angle of the deflector is unchanged and the linearity, which takes a negative value, is deteriorated, or when the linearity is unchanged and the swing angle of the deflector corresponding to the maximum rotational angle of the deflector increases. In the former case, the deterioration of linearity hampers realization of a favorable constancy in the scanning speed in the optical scanning apparatus. In the latter case, the increase in the swing angle of the deflector corresponding to the maximum rotational angle of the deflector makes the change in the scanning speed dominantly sinusoidal vibrational change so as to deteriorate the linearity. However, since the linearity is unchanged, the deviation of the spot diameter of the main scanning light beam deteriorates due to the optical correction performed for keeping the linearity unchanged. Thus, when Lin.$\times (\phi_{max}/\phi_0)$ becomes lower than the lower limit of the above conditional equation (2), the optical scanning apparatus can achieve neither the favorable linearity on the scanned surface nor the favorable deviation of the spot diameter of the main scanning light beam corresponding to the image height. Further, Lin.$\times (\phi_{max}/\phi_0)$ becomes larger than the upper limit when the swing angle of the deflector corresponding to the maximum rotational angle of the deflector is unchanged and the linearity is decreased, or when the linearity is unchanged and the swing angle of the deflector corresponding to the maximum rotational angle of the deflector decreases. In the former case, when the optical correction is performed to decrease the linearity, the deviation of the spot diameter of the main scanning light beam on the scanned surface corresponding to the image height deteriorates as mentioned above. In the latter case, the increase in the maximum rotational angle of the deflector is limited in view of the manufacturing condition of the sinusoidal vibration mirror serving as the deflector. In addition, if the swing angle of the deflector is decreased, the distance between the deflector and the scanned surface must be increased to secure the effective writing width necessary for the image formation, which increases the dimension of the optical scanning apparatus. Therefore, when Lin.$\times (\phi_{max}/\phi_0)$ is larger than the upper limit of the above conditional equation (2), the optical scanning apparatus can achieve neither the favorable deviation of the spot diameter of the main scanning light beam on the scanned surface corresponding to the image height, nor the favorable effective writing width.

As can be seen from the foregoing, the optical scanning apparatus according to the first embodiment which satisfies the above conditional equation (2) can realize a wider effective writing width, or a more favorable linearity on the scanned surface, or more favorable deviation of the spot diameter of the main scanning light beam on the scanned surface corresponding to the image height. Thus, the optical scanning apparatus can be downsized, and the inconveniences caused by the vibrations such as banding, temperature rise, noises, increased power consumption can be significantly decreased, whereby the environmentally-friendly optical scanning apparatus suitable for office environment and capable of high-quality image formation can be provided at low cost.

Second Embodiment

With Regard to Lower Limit in Conditional Equation (2)

Since a structure of an optical scanning apparatus according to a second embodiment is not largely different from the structure of the optical scanning apparatus according to the first embodiment, the optical scanning apparatus according to the second embodiment will be described with reference to FIG. 1 again. The optical scanning apparatus according to the second embodiment is different from the optical scanning apparatus according to the first embodiment in that the amplitude angle $\phi_0$ of the sinusoidal vibration mirror serving as the deflector 6 is set as:

$$\phi_0: \pm 24°.$$

The maximum rotational angle $\phi_{max}$ of the sinusoidal vibration mirror corresponding to the effective writing width in the second embodiment is, similarly to the first embodiment:

$\phi_{max}$:±15°, and therefore, $\phi_{max}/\phi_0 = 0.625$.

In comparison with the first embodiment, the rate of the maximum rotational angle corresponding to the effective writing width to the amplitude angle of the sinusoidal vibration mirror increases. Therefore, the change in the angular velocity of the deflection of the sinusoidal vibration mirror in the effective writing width deviates farther from the linear behavior in comparison with that in the first embodiment, and becomes closer to the sinusoidal behavior. Thus, the degree of decrease in the scanning speed increases at peripheral image height so as to generate the linearity at the negative side (−13.705%).

In the second embodiment, the same lens data as that employed in the first embodiment is used. Hence, the maximum rotational angle of the sinusoidal vibration mirror corresponding to the effective writing width is the same as that in the first embodiment, and therefore, the deviation of the spot diameter of the main scanning light beam on the scanned surface corresponding to image height is the same as that in the first embodiment (10.5%).

Here, $Lin. \times (\phi_{max}/\phi_0) = -0.086$, and this value is in the neighborhood of the lower limit of the conditional equation (2), i.e., $-0.09 < Lin. \times (\phi_{max}/\phi_0) < 0$.

When the linearity moves further toward the negative side than in the second embodiment, favorable constancy of the scanning speed cannot be obtained. For example, even if the dot position of the main scanning light beam is corrected additionally by the light source driving unit described later, there is a limit in the corrected amount as mentioned earlier. Therefore, favorable constancy in the scanning speed cannot be realized anyway, whereby the image quality is degraded. Further, when the rate of maximum rotational angle corresponding to the effective writing width to the amplitude angle of the sinusoidal vibration mirror is higher than the rate in the second embodiment, the change in the angular velocity of the deflection of the sinusoidal vibration mirror exhibits even more sinusoidal behavior, with the scanning speed further slows for peripheral image height. Thus, favorable constancy in the scanning speed cannot be obtained and the image quality degrades. Based on the above-described reasons, the lower limit in the conditional equation (2) is set.

With Regard to Upper Limit in Conditional Equation (2)
When $Lin. \times (\phi_{max}/\phi_0) < 0$, the deviation of the spot diameter of the main scanning light beam decreases in comparison with that obtained when the linearity is corrected to zero with the use of the farcsin lens having the imaging characteristics represented by the equation (1). In this case, obtained images have higher quality than the quality of images formed by the optical scanning apparatus including the farcsin lens. Based on this fact, the upper limit of the conditional equation (2) is set.

In consideration of specification of the sinusoidal vibration mirror serving as the deflector 6, the maximum rotational angle corresponding to the effective writing width, or a level of the deviation of the spot diameter of the main scanning light beam that can guarantee the image quality, it is preferable that the optical scanning apparatus have a scanning/imaging system which satisfies a conditional equation (4):

$$-0.09 < Lin. \times (\phi_{max}/\phi_0) < -0.03 \qquad (4).$$

Third Embodiment

With Regard to Upper Limit in Conditional Equation (4)

Since a structure of an optical scanning apparatus according to a third embodiment is not significantly different from the structure of the optical scanning apparatus according to the first embodiment, the third embodiment will be described with reference to FIG. 1 again. Here, the optical scanning apparatus of the third embodiment is different from the optical scanning apparatus of the first embodiment in that the amplitude angle $\phi_0$ of the sinusoidal vibration mirror which serves as the deflector 6 is set as:

$\phi_0$:±28°.

Further, the maximum rotational angle $\phi_{max}$ of the sinusoidal vibration mirror corresponding to the effective writing width in the third embodiment is set similarly to the first embodiment as:

$\phi_{max}$:±15 and therefore, $\phi_{max}/\phi_0 = 0.536$

Since the rate of the maximum rotational angle corresponding to the effective writing width to the amplitude angle of the sinusoidal vibration mirror is decreased in comparison with that in the first embodiment, the change in the angular velocity of the deflection of the sinusoidal vibration mirror at the effective writing width shows a more linear behavior in comparison with that in the first embodiment. Hence, the degree the scanning speed slows at the peripheral image height decreases, and the linearity, which takes a negative value, is corrected to the positive side. Thus, the constancy of the scanning speed becomes more favorable (−6.676%).

Further, lens data is the same as that employed in the first embodiment, and the maximum rotational angle of the sinusoidal vibration mirror corresponding to the effective writing width is the same as that of the first embodiment. Therefore, the deviation in the spot diameter of the main scanning light beam on the scanned surface corresponding to the image height is the same as that in the first embodiment (10.5%).

Here, $Lin. \times (\phi_{max}/\phi_0) = -0.036$, and this value is in the neighborhood of the upper limit of the conditional equation (4), i.e., $-0.09 < Lin. \times (\phi_{max}/\phi_0) < -0.03$.

When the linearity, which takes more negative value than the value in the third embodiment, is corrected to the positive side so that a favorable constancy in the scanning speed is obtained, the deviation in the spot diameter of the main scanning light beam corresponding to the image height increases by the corrected amount of the linearity, which results in the degradation of the image quality. Further, the amplitude angle of the current sinusoidal vibration mirror approaches its limit approximately at the amplitude angle of the third embodiment. If the rate of the maximum rotational angle corresponding to the effective writing width to the amplitude angle of the sinusoidal vibration mirror is to be lowered than the rate of the third embodiment, the maximum rotational angle corresponding to the effective writing width must be decreased. Then, a longer distance between the deflection mirror and the scanned surface is required to guarantee the predetermined effective writing width, resulting in a larger dimension of the apparatus. Based on the above reasons, the upper limit of the conditional equation (4) is set.

Fourth Embodiment

Correction of Dot Position of Main Scanning Light Beam by Light Source Driving Unit Since a structure of an optical scanning apparatus according to a fourth embodiment is not largely different from that of the optical scanning apparatus according to the first embodiment, the optical scanning apparatus of the fourth embodiment will be described with reference to FIG. 1 again. Here, the optical scanning apparatus of the fourth embodiment is different from the optical scanning apparatus of the first embodiment in that the light source driving unit (not shown), which controls the lighting of the light source 1, has a function of independently setting a timing to start lighting of each pixel in one line. The structure of the fourth embodiment will be described further with reference to a model diagram of FIG. 5.

Figure 5A:
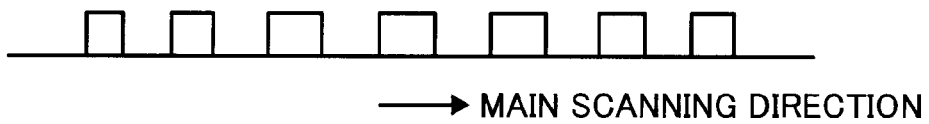
FIGS. 5A and 5B are diagrams for explaining a function of setting an independent timing to start lighting of each pixel in one line.
Figure 5B:
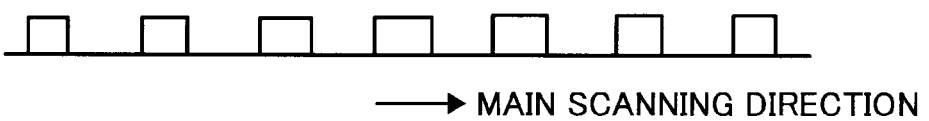

As shown in FIG. 3, the linearity decreases towards the peripheral image height in the fourth embodiment. Therefore, when a frequency of image signals is fixed and each pixel in one line is made to start lighting at fixed timing, intervals between dots become narrower toward the periphery as shown in FIG. 5A. Then, magnification error occurs on the image. To deal with this inconvenience, the light source driving unit can set the timing to start lighting of each pixel in one line independently of each other, so as to equalize the intervals between the pixels in the main scanning direction of exposure distribution, though the width of the exposure distribution becomes narrower toward the periphery in the main scanning direction as shown in FIG. 5B. Further, though integrated intensity of light is different for each pixel due to the above setting, the integrated intensity of light can be equalized on pixel-to-pixel basis when the light source driving unit is provided with a unit to set a lighting time of each pixel in one line independently.

When the intervals between pixels and the integrated intensity of light of each pixel in the main scanning direction of the exposure distribution are set equal, the spot position of the main scanning light beam on the scanned surface is equally scanned. In other words, when the magnification error of the image generated by the optical function is offset by the electric correction, the trade-off relation between the constancy of the scanning speed and the deviation in the spot diameter of the main scanning light beam on the scanned surface corresponding to the image height is broken, whereby a more favorable constancy of the scanning speed can be achieved without compromising the favorable degree of the deviation in the spot diameter of the main scanning light beam corresponding to the image height. Thus, an optical scanning apparatus which has a favorable maximum rotational angle corresponding to the effective writing width of the deflector 6, a favorable degree of deviation in the spot diameter of the main scanning light beam on the scanned surface corresponding to the image height, and a favorable constancy of the scanning speed can be provided.

As described above, the light source driving unit according to the fourth embodiment, in addition to the structure according to the first embodiment, includes a function of independently setting the timing to start lighting of each pixel in one line. Therefore, it is possible to provide the optical scanning apparatus which, in addition to the advantageous effects of the above embodiments, can correct the dot position of the main scanning light beam on the scanned surface, obtain a favorable constancy of the scanning speed, and form a high-quality image.

The corrected amount of the dot position of the main scanning light beam by the light source driving unit should be suppressed to a small amount. When the scanning lens is manufactured and processed in an ideal state and embedded into the optical scanning apparatus in an ideal condition, it is possible to correct the linearity, which is biased significantly toward the negative side when the f-theta lens is used, with the use of the light source driving unit. However, the productivity lowers when the processing of the scanning lens and the optical scanning apparatus is to be performed in an ideal condition, and therefore, the mass production is unachievable and costs increase. In consideration of the necessity of efficient manufacture of scanning lenses and optical scanning apparatuses for cost reduction, it is inevitable that shape error of the scanning lens occurs during the shaping of the scanning lens, or that positioning error occurs during the assembly of the scanning lens, for example. If the scanning lens is attached to the optical scanning apparatus slightly towards the positive side of the image height, for example, a large correction amount of the dot position of the main scanning light beam by the light source driving unit results in an excessively large correction amount at the peripheral image height at the positive side, whereby the dot position is corrected to a unnecessarily large amount, and the scanning speed increases. Further, at the peripheral image height at the negative side, the correction amount is excessively small, and the scanning speed does not reach a desirable level. As a result, a favorable constancy in the scanning speed cannot be obtained, and the image quality is degraded. Based on the above-described inconveniences, the correction amount of the waist position of the main scanning light beam by the light source driving unit should be suppressed to a small degree.

Embodiments of the optical scanning apparatus according to the present invention are described above. In the embodiments, the sinusoidal vibration mirror is employed as the deflector 6. Alternatively, however, the light may be deflected by diffraction caused by surface acoustic waves. The deflection angle may be prevented from changing at a constant angular speed with the use of equi-angular-velocity movement of the deflection mirror. Further, it is possible to arrange plural scanning/imaging optical systems in the main scanning direction so that the effective writing width increases further. In the exemplary structure of FIG. 1, the light source 1 is a single laser diode. Alternatively, a multi-beam structure including plural semiconductor lasers, or a semiconductor laser array having plural light-emitting points may be employed. Such variations fall within the scope of the present invention. Further, the deflector 6 may be configured as a combination of a sinusoidal vibration mirror (deflection mirror) and plural stationary mirrors so that the light beam is reflected plural times.

Fifth Embodiment

Figure 6:
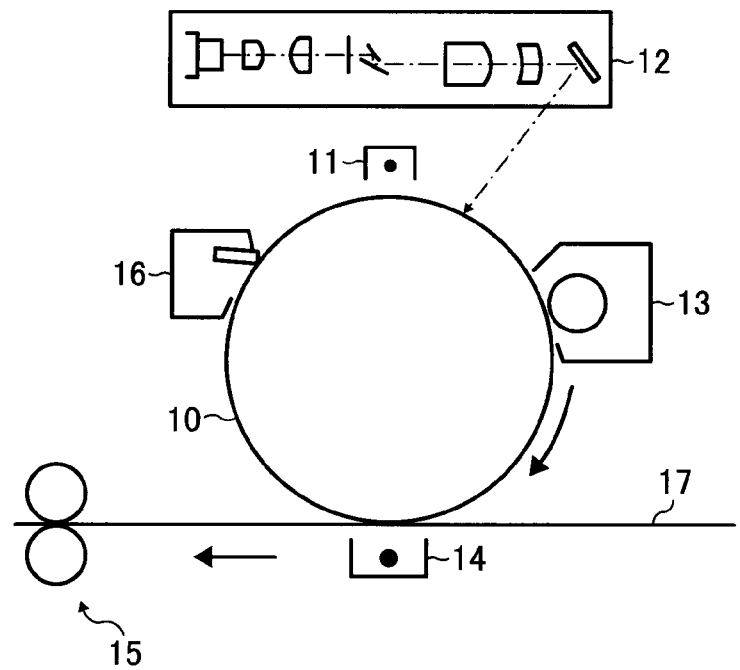
FIG. 6 is a schematic diagram of a structure of an image forming apparatus according to one embodiment of the present invention.

An image forming apparatus according to a fifth embodiment of the present invention will be described. FIG. 6 shows a schematic structure of the image forming apparatus according to the fifth embodiment of the present invention. In FIG. 6, a reference character 10 denotes a photoreceptor on a drum which serves as an image carrier, 11 denotes a charging unit which charges the photoreceptor 10, 12 denotes an optical writing unit which exposes the charged photoreceptor 10 with a light beam according to image information so as to form a latent image, 13 denotes a developing unit which develops the latent image on the photoreceptor 10 using toner, for example, so as to form a visible image, 14 denotes a transferring unit which transfers the visible image (toner image) on the photoreceptor 10 to a transfer material 17 such as a sheet of recording paper, 15 denotes a fixing unit which fixes the visible image (toner image) transferred onto the transfer material 17, and 16 denotes a cleaning unit which cleans the surface of the photoreceptor 10 after the image transfer. The image forming apparatus forms and outputs an image on the transfer material by performing the steps of charging, exposing, developing, transferring, fixing, and cleaning (i.e., electrophotographic processes).

In FIG. 6, the photoreceptor 10 is made of a drum-like conductive base whose surface is covered with a photoconductor layer (photosensitive layer) of an inorganic material or an organic material. The surface of the photoreceptor 10 is the scanned surface. The photoreceptor 10 can be a belt-like member rather than a drum-like member. In FIG. 6, the charging unit 11 is a corona charger. Alternatively, however, the charging unit 11 can be a charging roller, a charging brush, and the like. The optical writing unit 12 of the fifth embodiment is the optical scanning apparatus having the structure shown in FIG. 1. The details of the optical scanning apparatus are described in relation to the other embodiments. The developing unit 13 can be a developing device which uses one-component-type developer containing toner alone, or a developing device which uses two-component-type developer containing toner and carrier, for example. Though the transferring unit 14 is a transferring charger in FIG. 6, various units such as a transferring roller, a transferring belt, and a transferring brush can be used as the transferring unit 14. The fixing unit 15 fixes an image on the transfer material by heating or pressurizing or both. Units with various structures such as a fixing roller including a heating roller and a pressurizing roller, and a fixing belt including a belt and a heater can be used as the fixing unit 15. As the cleaning unit 16, units with various structures such as a blade-type unit, a brush-type unit, and a roller-type unit can be used.

FIG. 6 is an example of a monochrome image forming apparatus. The optical scanning apparatus of the present invention, however, is applicable to an optical writing unit of a multi-color image forming apparatus which forms images in two or more colors or a full-color image forming apparatus. An embodiment shown in FIGS. 7 and 8 is a full-color image forming apparatus which guides plural light beams emitted from plural light sources corresponding to yellow, magenta, cyan, and black, respectively, to plural corresponding image carriers 10Y, 10M, 10C, and 10K using plural separating units 9Y, 9M, 9C, and 9K.

Figure 7:
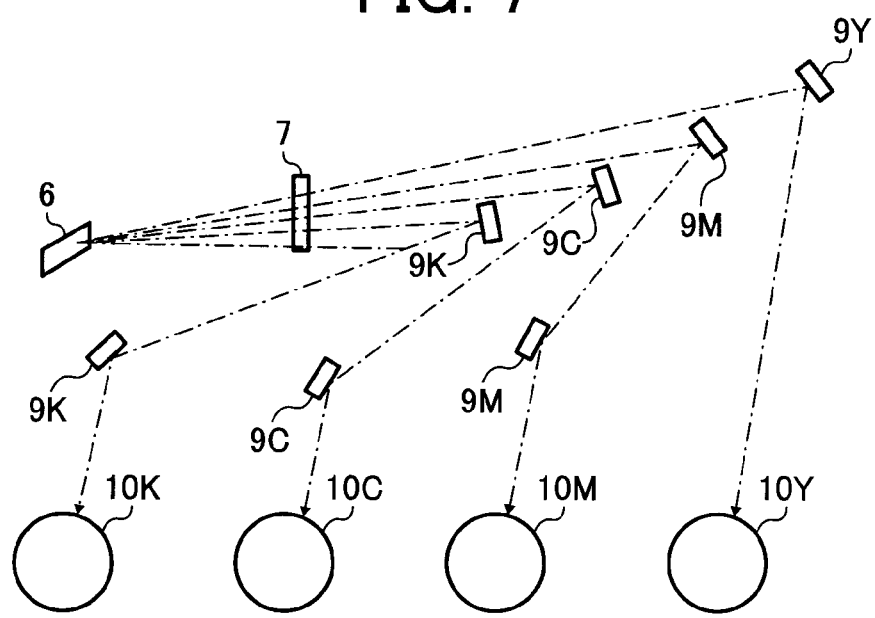
FIG. 7 is a schematic diagram of a structure of a full-color image forming apparatus including an optical scanning apparatus which irradiates light from one side at a slanted incident angle according to one embodiment of the present invention.
Figure 8:
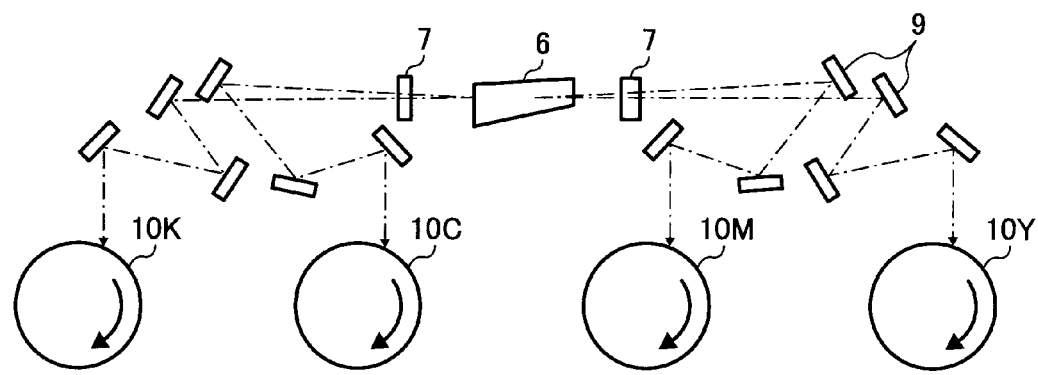
FIG. 8 is a schematic diagram of a structure of a full-color image forming apparatus including an optical scanning apparatus which irradiates light from two sides at a slanted incident angle according to one embodiment of the present invention.

FIG. 7 schematically shows how plural light beams deflected by the deflector 6 are guided to the plural corresponding image carriers (photoreceptors) 10Y, 10M, 10C, and 10K in the multi-color optical scanning apparatus using two or more colors or the full-color optical scanning apparatus according to the embodiment. The plural light beams emitted from plural light sources (not shown) are directed to a deflecting surface provided at one side of the single deflector 6 at different incident angles in the sub-scanning direction. The deflector 6 deflects and reflects the plural light beams and directs them to the separating units 9Y, 9M, 9C, 9K, respectively, which scan the surfaces of the plural image carriers 10Y, 10M, 10C, and 10K, respectively with the separated light beams, so as to form latent images.

When the optical scanning apparatus is configured as a multi-color optical scanning apparatus using two or more colors or a full-color optical scanning apparatus, plural light beams emitted from plural light sources (not shown) may be directed to deflecting surfaces provided on two sides of the single deflector 6 so that at least two of the plural light beams are directed to each of the deflecting surfaces at different incident angles in the sub-scanning direction and deflected. The deflected and reflected light beams are separated by the separating units 9, and made to scan the surfaces of the image carriers 10Y, 10M, 10C, and 10K, respectively, so as to form latent images.

As can be seen from the foregoing, when the optical scanning apparatus according to any one of the first to the fourth embodiments is employed as the optical writing unit, the latent image can be written on the image carrier while a predetermined effective writing width is maintained, the constancy in the scanning speed on the scanned surface is kept favorable, and the deviation in the spot diameter of the main scanning light beam according to image height is suppressed. Therefore, an image forming apparatus can be provided in small size, at low cost, and with a capacity of forming high-quality images.

Further, when the image forming apparatus according to the fifth embodiment is provided with plural light sources and plural image carriers, a full-color tandem image forming apparatus can be provided in small size, at low cost, and with a capacity of forming high-quality images.

The present invention is generally applicable to optical scanning apparatuses and image forming apparatuses.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:
   a light source;
   a light source driving unit that turns on the light source according to image information;
   a deflector that deflects and scans a light beam emitted from the light source according to sinusoidal vibration; and
   a scanning/imaging optical system that guides the light beam from the deflector to a scanned surface,
   wherein the scanning/imaging optical system satisfies
   (1) provided that the deflector moves in such a manner that an angular velocity is constant, linearity is made larger at a most peripheral image height than at a central image height within a range of an effective writing width, and
   (2) when a deflection angle of the deflector has a sinusoidal characteristic, the linearity is made smaller at the most peripheral image height than at the central image height within the range of the effective writing width.

2. The optical scanning apparatus according to claim 1, wherein
   a conditional equation $$-0.09 < \text{Lin.} \times (\phi_{max}/\phi_0) < 0$$

(where Lin. represents a minimum value of the linearity when the deflection angle undergoes sinusoidal vibration, $\phi_0$ represents an amplitude angle (°) of the sinusoidal vibration of the deflector, and $\phi_{max}$ represents a maximum rotational angle (°) of the deflector corresponding to the effective writing width) is satisfied.

3. The optical scanning apparatus according to claim 1, wherein
the light source driving unit has a function of independently setting a timing to start lighting of each pixel in one line.

4. An image forming apparatus comprising:

an image carrier;

a charging unit that charges the image carrier;

an optical writing unit that directs light to the image carrier charged to form a latent image;

a developing unit that develops the latent image to form a visible image; and a transferring unit that transfers the visible image on the image carrier to a transfer material to form an image, wherein the optical writing unit is the optical scanning apparatus according to claim 1.

5. The image forming apparatus according to claim 4, further comprising plural light sources and plural image carriers.

* * * * *